March 13, 1951  V. K. STRATTON ET AL  2,545,119
TRAILER HITCH ASSEMBLY

Filed March 24, 1947  2 Sheets-Sheet 1

Inventor
David A. McClellen
Verlin K. Stratton

By *Clarence A. O'Brien and Harvey B. Jacobson*
Attorneys

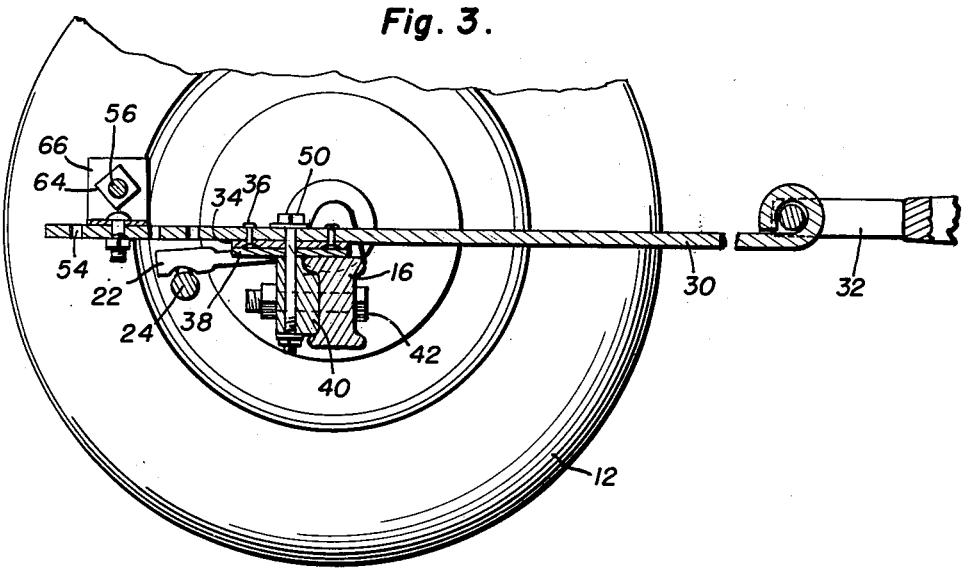
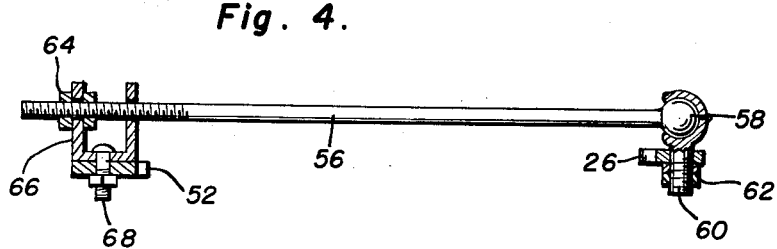
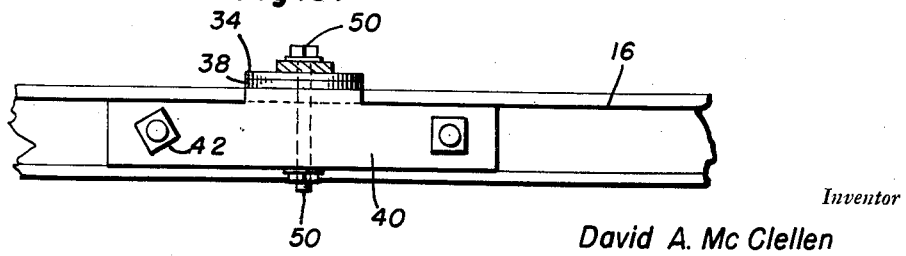

Patented Mar. 13, 1951

2,545,119

UNITED STATES PATENT OFFICE 2,545,119

TRAILER HITCH ASSEMBLY

Verlin K. Stratton and David A. McClellen, North English, Iowa, assignors to Alva Allen, North English, Iowa Application March 24, 1947, Serial No. 736,650

4 Claims. (Cl. 280—33.55)

This invention relates generally to trailer hitches, and more particularly to a trailer hitch assembly adapted for use with four-wheel trailers, including trailers having the general character of wagons linked behind a corn picker, as well as trailers adapted to be hauled along a highway by a truck or an automobile, the device being a combined hitch and steering mechanism for the trailer.

It is well understood that hitches and steering mechanisms have been developed and used with four-wheel trailers, and this application is drawn to certain improvements and refinements in the construction of such hitches, rather than to the basic construction of such devices, the present invention providing for simplification and an improved adjustability, rendering the device particularly well adapted to perform the functions required thereof.

A primary object of this invention is, therefore, to provide a simple, easily adjusted, and safe hitch for four-wheel trailers, in which the front wheels of the trailer will be turned to properly follow the hauling vehicle.

Another object of this invention, ancillary to the preceding object, is to provide a hitch and steering mechanism which will allow a four-wheeled trailer to be hauled with considerable speed without danger of causing the trailer to whip, it being understood that many accidents result from a trailer swaying and whipping from side to side when the device is hauled at a considerable rate of speed, such swaying or whipping having a tendency to gradually increase until the hauling vehicle is thrown out of control.

Another object of this invention is to provide a steering mechanism in connection with a trailer hitch which may be used with farm implements, as exemplified by the use of this device on a wagon drawn behind a corn picker, it being important in such uses that the hauled vehicle be maintained in proper relationship with the hauling vehicle so that corn will not be thrown over the side of the wagon box, when the machine must be turned, as at the end of a row.

Still another object of this invention is to provide a trailer hitch in which the steering mechanism is minutely adjustable to provide for small variations in the steering characteristics of the trailer.

And a still further object of this invention is to provide a simplified and improved method of securing the tongue to the front axle of the trailer.

A last object to be specifically mentioned is to provide a device of this character which is relatively inexpensive and practicable to manufacture, extremely simple and convenient to install, adjust and use, and which is sufficiently sturdy to provide for generally efficient and durable service.

With these and other objects in view, this invention resides in certain novel features of construction, combination and arrangement of parts and portions as will be hereinafter described in detail, reference being had to the accompanying drawings which form a material part of this application, and in which:

Figure 3 is a vertical sectional view, showing the left front wheel in elevation, and taken on the line 3—3 in Figure 2;

Figure 4 is an enlarged detail view of the link between the extending portions of the tongue and the steering arm, the view being a longitudinal vertical sectional view, taken on the line 4—4 in Figure 2;

Figure 5 is a fragmentary view of a portion of the front axle of a trailer and the means used to pivotally secure the tongue to such an axle, the view being an elevation taken on the line 5—5 in Figure 2.

Similar characters of reference designate similar or identical parts and portions throughout the specification and throughout the several views of the drawings.

Figure 1:
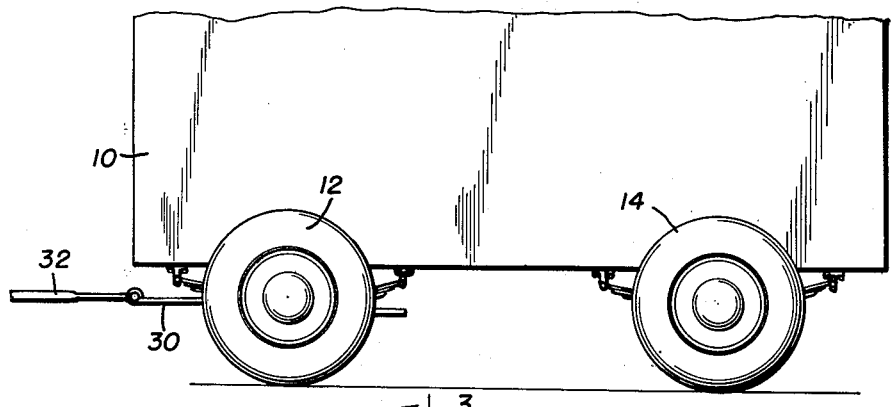
Figure 1 is a side elevational view of a four-wheeled trailer with this invention secured thereto.
Figure 2:
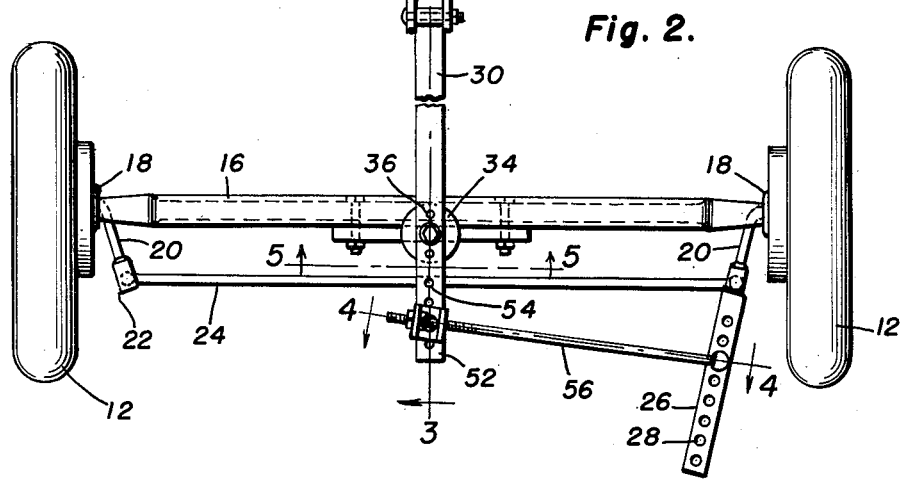
Figure 2 is a top plan view of the front wheels, front axle and contiguous portions of such a trailer, with this invention operatively secured thereto.

Referring now to the drawings in detail, it will be noted that a trailer 10, which may be of any one of many different forms, having front wheels 12 and rear wheels 14, a front axle 16, and wheel spindles of which the inner portions are indicated at 18, constitutes suitable environment wherewith this invention may be properly used.

A pair of steering arms 20 are rigidly secured at one end thereof to the spindles 18, the outer ends of these steering arms terminating in ball and socket joints 22 whereby the tie rod 24 is secured to and between the outer ends of these steering arms 20.

In the drawings, this tie rod 24 has been represented as disposed to the rear of the axle 16, but this construction is not an essential requirement of this invention inasmuch as the steering arms 20 may be disposed towards the front of the axle 16, a construction which is preferable in some instances.

Figure 6:
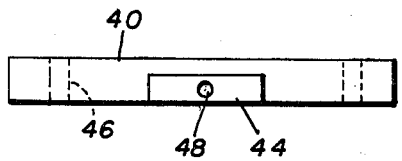
Figure 6 is a top plan view of the ribbed member adapted to be bolted to the said front axle.

One of the steering arms 20 is provided with an extending portion 26 which is disposed at an acute angle with the longitudinal center line of the trailer when the tongue 30 is parallel to said center line. The portion 26 is provided with spaced apertures 28. The tongue 30 is provided at the front end thereof with means allowing the pivotal attachment of the tongue to the draw bar 32 of the hauling vehicle, while the intermediate portion of the tongue is provided with a friction plate 34 which will normally be of disc character, this disc plate being secured by the rivets 36. A similarly shaped disc plate 38 is adapted to frictionally contact the plate 34 and rests upon the top surface of the axle 16 and the top surface of the ribbed member 40. This ribbed member is an elongated bar configured to fit closely onto the axle 16 and provided with apertures allowing the attachment thereof to said axle by the bolts 42. The form of this plate is illustrated clearly in Figures 3, 5 and 6, the upper end portion being represented at 44, and the apertures for the bolts 42 being represented by the dotted lines 46. It will be noted that the ribbed member 40 is centrally and vertically apertured, as at 48, for the insertion therethrough of the pivot bolt 50 which retains the tongue 30, plates 34 and 38, and the ribbed member 40 in proper positional relationship, it being understood that a suitable complement of lock washers and nuts will be added to this assembly.

The tongue 30 is provided with a rearwardly extending portion 52 which is regularly apertured, as at 54.

A link 56 of rod character is provided with a ball and socket joint 58 with a screw-threaded pin 60 adapted to be secured by nuts 62 to the extending portion 26 of one of the steering arms 20, the member 60 being inserted through one of the apertures 28 in the said extending portion. The other end of this link member 56 is screw-threaded to receive the sleeve nut 64 which is secured in one of the arms of the U-shaped channel member 66 which is used to secure this end of the link 56 to the tongue 30, a bolt 68 being inserted through the base portion of the channel member 66 and selectively insertable in the apertures 54 in the extending portion 52 of said tongue. It will be understood that the pin member 60 on the other end of this link 56 is also selectively securable in the apertures 28 in the extending portion of the arm 20, and that a very accurate adjustment of the link 56 may be made by moving one or both ends thereof.

The operation of this invention will be clearly understood from the foregoing description of the mechanical details thereof, taken in connection with the above recitation of the objects sought to be achieved by this invention; but, in recapitulation, it may be noted that the trailer is pulled by the tongue 30 and that the steering assembly described above acts in conjunction with said tongue when the same is moved from side to side when the hauling vehicle changes directions. It will thus be seen that the trailer will be made to follow without undue side thrust being applied to the rear end of the hauling vehicle, the front end of the trailer being automatically self-aligning with the rear end of the hauling vehicle. The device facilitates the adjustment of the alignment of said front wheels with a hauling vehicle, the adjustment of the effective movement of the extending portion of the tongue relating to the link 56, and the adjustment of the movement of the steering arms 20 relative to the movement of the link 56, whereby the hauled vehicle such as the wagon behind a corn picker, can be made to track perfectly.

Though there has been described a particular embodiment of this invention, this application is not limited to this particular embodiment, but it is desired to include in the scope of this invention the construction, combination and arrangement of parts and portions substantially as set forth in the appended claims.

What is claimed as new and desired to be secured by Letters Patent is:

1. A trailer hitch assembly for use with four-wheel trailers having front wheels mounted on spindles pivoted on the ends of an axle, comprising a pair of steering arms rigidly connected to said spindles, a tie rod connecting said arms, a tongue pivotally secured to said axle, and an inflexible link securable to said tongue, an extending portion on said one of said steering arms, said link being adjustably and directly secured terminally to said extending portion, so that the link is adjustable as to its operatively effective length, said extending portion being disposed at an acute angle with the longitudinal center line of the trailer when the tongue is parallel to said center line.

2. A trailer hitch assembly for use with four-wheel trailers having front wheels mounted on spindles pivoted on the ends of an axle, comprising a pair of steering arms rigidly connected to said spindles, a tie rod connecting said arms, a tongue pivotally secured to said axle, and an inflexible link securable to said tongue, said tongue and steering arm having extending portions and said link being adjustably and directly secured terminally to and between said extending portions, so that the link is adjustable as to its operatively effective length, said extending portion being disposed at an acute angle with the longitudinal center line of the trailer when the tongue is parallel to said center line, facilitating the adjustment of the alignment of said front wheels with a hauling vehicle, the adjustment of the effective movement of the extending portion of the tongue relating to said link, and the adjustment of the movement of said steering arms relative to the movement of said link.

3. A trailer hitch assembly for use with four-wheel trailers having front wheels mounted on spindles pivoted on the ends of an axle, comprising a pair of steering arms rigidly connected to said spindles, a tie rod connecting said arms, a tongue pivotally secured to said axle, and an inflexible link securable to said tongue, rearwardly extending portions on said tongue and on one of said steering arms, and said link being adjustably and directly secured terminally to and between said extending portions, so that the link is adjustable as to its operatively effective length, said extending portion being disposed at an acute angle with the longitudinal center line of the trailer when the tongue is parallel to said center line, facilitating the adjustment of the alignment of said front wheels with a hauling vehicle, the adjustment of the effective movement of the extending portion of the tongue relating to said link, and the adjustment of the movement of said steering arms relative to the movement of said link.

4. A trailer hitch assembly for use with four-wheel trailers having front wheels mounted on spindles pivoted on the ends of an axle, comprising a pair of steering arms rigidly connected to said spindles, a tie rod connecting said arms, a tongue pivotally secured to said axle, and an inflexible link securable terminally to said tongue and to an extending portion of one of said steering arms, so that the link is adjustable as to its operatively effective length, said extending portion being disposed at an acute angle with the longitudinal center line of the trailer when the tongue is parallel to said center line, said tongue being secured to said axle by a ribbed member bolted to one side of said axle, a friction disc plate mounted on said member, a registering disc plate secured to said tongue, and a pivot bolt secured through said tongue, plates, and member.

VERLIN K. STRATTON.
DAVID A. McCLELLEN.

REFERENCES CITED

The following references are of record in the file of this patent:

UNITED STATES PATENTS

| Number | Name | Date |
|---|---|---|
| 1,313,382 | Hiller | Aug. 19, 1919 |
| 1,577,788 | Cole | Mar. 23, 1926 |
| 1,591,162 | Ekstrand | July 6, 1926 |
| 1,662,560 | Bolt | Mar. 13, 1928 |

OTHER REFERENCES

Dyke's, A. L. Dyke, St. Louis, Mo., 1927.